United States Patent [19]

Elm et al.

[11] Patent Number: 5,412,029

[45] Date of Patent: May 2, 1995

[54] PROTECTIVE MATERIAL CAPABLE OF APPLICATION IN MOLTEN FORM

[75] Inventors: Rainer Elm, Marl; Helmut Kehr, Schermbeck; Adolf Kühnle, Marl; Matthias Schleinzer, Dorsten, all of Germany

[73] Assignee: Huels Aktiengesellschaft, Marl, Germany

[21] Appl. No.: 138,000

[22] Filed: Oct. 19, 1993

Related U.S. Application Data

[63] Continuation of Ser. No. 743,894, Aug. 12, 1991, abandoned.

[30] Foreign Application Priority Data

Aug. 24, 1990 [DE] Germany ............... 40 26 719.9

[51] Int. Cl.$^6$ .............................................. C08L 51/06
[52] U.S. Cl. ................................. 525/71; 525/72; 525/73; 525/74; 525/78; 525/80; 524/504; 524/487; 524/78
[58] Field of Search ............... 525/74, 78, 285, 301, 525/72, 73, 80, 71; 524/504

[56] References Cited

U.S. PATENT DOCUMENTS

| | | | |
|---|---|---|---|
| H568 | 1/1989 | Tanaka et al. | 525/74 |
| 3,481,910 | 12/1969 | Brunson | 525/285 |
| 3,642,722 | 2/1972 | Knowles et al. | 525/285 |
| 3,900,361 | 8/1975 | Hoppe et al. | 156/334 |
| 3,974,129 | 8/1976 | De La Mare | 525/285 |
| 4,022,728 | 5/1977 | Trotter et al. | 525/232 |
| 4,078,017 | 3/1978 | Nagatoshi et al. | 525/285 |
| 4,259,470 | 3/1981 | Trotter et al. | |
| 4,309,522 | 1/1982 | Dietrich et al. | |
| 4,506,056 | 3/1985 | Gaylord | 525/301 |
| 4,567,223 | 1/1986 | Ames | 525/240 |
| 4,599,385 | 7/1986 | Clayton et al. | 525/301 |
| 4,822,688 | 4/1989 | Nogues | 525/285 |

FOREIGN PATENT DOCUMENTS

| | | |
|---|---|---|
| 0368452 | 5/1990 | European Pat. Off. . |
| 0394636 | 10/1990 | European Pat. Off. . |
| 1569031 | 8/1969 | Germany . |
| 2532160 | 1/1977 | Germany . |
| 3444158 | 6/1986 | Germany . |
| 03229772 | 10/1991 | Japan . |
| 1449316 | 9/1976 | United Kingdom . |

*Primary Examiner*—Carman Seccuro, Jr.
*Attorney, Agent, or Firm*—Oblon, Spivak, McClelland, Maier & Neustadt

[57] ABSTRACT

A protective material, based on poly-α-olefins, capable of easy application in molten form, is distinguished by a balanced pattern of properties, good adhesion and good recycling capability. The present protective materials contain (I) not less than 50% by weight of one or more largely amorphous poly-α-olefins, composed of (a) 3 to 75% by weight of one or more α-olefins containing 4 to 10 carbon atoms, (b) 25 to 95% by weight of propene, and (c) 0 to 20% by weight of ethene; (II) not more than 30% by weight of other olefin homo- and copolymers which may be either largely amorphous or preferably partially crystalline; and (III) not more than 40% by weight of additives which are standard in the plastic sector. Such protective materials can be used in particular in the underfloor region of motor vehicles.

8 Claims, No Drawings

PROTECTIVE MATERIAL CAPABLE OF APPLICATION IN MOLTEN FORM

This application is a continuation of application Ser. No. 07/743,894, filed on Aug. 12, 1991, now abandoned.

BACKGROUND OF THE INVENTION

1. Field of the Invention

The present invention relates to low-temperature and heatresistant materials for reducing noise and for protection against weathering effects, corrosion and stone chipping, which can be used, in particular, in the underfloor region of motor vehicles.

2. Discussion of the Background

At present, underfloor protective materials for motor vehicles are still predominantly PVC plastisols which, as a rule, are sprayed by the "airless method" and then gelled. These systems have an adequate low-temperature resistance, heat resistance and abrasion resistance, and offer adequate corrosion protection.

The market has recently been imposing requirements in relation to recycling capability in addition to requirements relating to the material properties themselves, and at the same time, demanding the restriction to as few types of plastics as possible. Thus, it has become necessary to develop a protective material which is mainly based on poly-α-olefins, since poly-α-olefins are already being used to an ever-increasing extent in other motor vehicle parts (for example, bumpers, cooling water compensation reservoirs, heating and ventilating systems). In particular, a protective material capable of application in molten form is also of interest, because it can be applied directly to the bodywork emerging hot from electrophoretic painting. Consequently, the energy-consuming steps of cooling and reheating of the bodywork, necessary for the application of PVC plastisols hitherto mainly used for this purpose, is superfluous. Therefore, both energy and time can be saved by use of a protective material based on poly-α-olefins.

Although various efforts have already been made in the past to develop such systems, the pattern of properties is generally too unbalanced. In particular, resin-containing hot melts, bitumen-containing systems or rubber-based, oil- and filler-containing materials are usually involved. In this connection, the resin-containing hot melts exhibit inadequate heat resistance as an important disadvantage. Bitumen-containing materials have the same disadvantage and are, in addition, too soft, while the adhesion is a problem in the case of oil- and filler-containing, rubber-based materials.

Amorphous poly-α-olefins such as, for example, atactic polypropylene, have also already been tested for this purpose. Apart from the fact that their mechanical properties did not meet the requirements, these amorphous poly-α-olefins were combined, for example, with resins, oils, bitumen, etc., and then additionally exhibited the disadvantages already mentioned above for these materials, such as inadequate heat resistance and hardness.

Thus, there remains a need for a composition which can reduce noise and protect metal against the effects of weather, corrosion and mechanical damage, such as that caused by collision with small debris. Further, the need to produce such a composition from materials which can be applied in an energy saving manner and which can be easily recycled is also strongly felt.

SUMMARY OF THE INVENTION

Accordingly, one object of this invention is to provide novel protective materials for metallic, primed or lacquered surfaces with a balanced pattern of properties.

A further object of the present invention is to provide novel protective materials exhibiting adequate heat resistance.

A further object of the present invention is to provide novel protective materials which are not too soft.

A further object of the present invention is to provide novel protective materials which can be applied to a hot surface.

A further object of the present invention is to produce novel protective materials which are recyclable.

These and other objects, which will become apparent during the following detailed description, have been achieved by the inventor's discovery that coating compositions containing a tailor-made amorphous poly-α-olefin as an essential constituent are particularly useful protective materials which exhibit excellent heat resistance and hardness, are recyclable, and can be applied to hot metal surfaces.

In particular, the present protective materials have the following composition:
  (I) not less than 50% by weight of poly-α-olefins, comprising the following monomers:
     (a) 3 to 75% by weight of α-olefins containing 4 to 10 carbon atoms,
     (b) 25 to 95% by weight of propene, and
     (c) 0 to 20% by weight of ethene;
  (II) not more than 30% by weight of other olefin homo- or copolymers; and
  (III) not more than 40% by weight of additives which are standard in the plastic sector.

DETAILED DESCRIPTION OF THE PREFERRED EMBODIMENTS

The component (I) can be produced in a controlled manner by polymerization using conventional Ziegler-Natta catalysts or their further developments. Particularly suitable are the propene/1-butene/ethene terpolymers and propene/1-butene copolymers; for example, the polymers disclosed in German Patent Specification 2,306,667 or German Patent Specification 2,930,108, which are obtainable under the trade name VESTOPLAST®. However, copolymers which contain an α-olefin having 5 to 10 carbon atoms in addition to, or instead of 1-butene such as, for example, 3-methyl-1-butene, 1-pentene, 1-hexene, 3,3-dimethyl-1-butene, 4-methyl-1-pentene, 1-heptene, 1-octene or 1-decene, are also suitable for use.

In a preferred embodiment not less than 70% by weight of the component (I) is used, and in a particularly preferred embodiment, not less than 80% by weight of the component (I) is used.

In general, the component (I) is largely amorphous; that is, it has a degree of crystallinity of not more than 25%, as determined by X-ray diffraction. Preferably, the component (I) has a degree of crystallinity of not more than 15%.

Preferably, component (I) includes those poly-α-olefins which have a softening point (determined by the ring-and-ball method in accordance with DIN 52,011) between 70° and 160° C., preferably from 80° to 110° C., a melt viscosity of between 500 and 200,000 mPa s at 190° C., preferably from 2,000 to 100,000 mPa s a density of less than 0.90 g/cm³, preferably between 0.85 and 0.90 g/cm³, a needle penetration (100/25/5; measured in accordance with DIN 52,010) of between 0.4 and 5.0 mm, preferably from 1.0 to 3.5 mm, an elongation at break of over 100% (DIN 53,455; rod 4), preferably of 250% or more, and a glass transition temperature (Tg) of less than −20° C., preferably of −25° C. or less.

Preferably, the component (I) contains 10 to 70% by weight of α-olefins containing 4 to 10 carbon atoms, particularly preferably 20 to 70%; 30 to 80% by weight of propene, particularly preferably 30 to 70%; and 0 to 10% by weight of ethene, particulary preferably 3 to 8%.

As component (II), use may be made of olefin copolymers which may be either largely amorphous or preferably, partially crystalline. For example, use may be made of partially crystalline polypropylene. In addition, other partially crystalline or largely amorphous polyolefins are also suitable. Preferably, component (II) has a crystallinity of 10–100%, particularly preferably 15–100% and most preferably, 25–100%. Not more than 20% by weight of the total composition of component (II) is preferably used, between 2 and 20% by weight of component (II) is particularly preferred and between 2 and 10% by weight of component (II) is most preferred. The melt flow index (MFI 190/5) should be more than 30 g/10 min, and preferably,-is more than 50 g/10 min.

As component (III), use may be made of additives such as, for example, resins, waxes, fillers, oils, rubbers, heat and light stabilizers, optical brighteners, antistatic agents, lubricants, anti-blocking agents, nucleating agents, dyestuffs, carbon black, pigments or flame-retarding agents. Preferably, the proportion of the additives is not more than 30% by weight, based on the total protective material. Most preferably, the additives of component (III) are present in from 0.2 to 20% by weight of the total mass of the composition. The proportion of resins, waxes, oils and/or rubbers of component (III) must not exceed 20% by weight, based on the total mass.

In a preferred embodiment, at least one of the components (I) and (II) is functionalized; that is, at least one of components (I) and (II) carries functional groups. These may be introduced directly by concomitant use of functional comonomers in the polymerization. Preferably, however, they are introduced by subsequent free-radical grafting by known methods. The graft copolymerization may be carried out in solution, or more preferably, is conducted in a melt.

The free-radical grafting is carried out at temperatures between 100° and 300° C., preferably between 150° and 250° C., under a nitrogen atmosphere in the presence of a free-radical initiator such as, for example, a peroxo compound, a diazo compound, a diacylperoxide or a mixture of an alkali metal sulfite and an alkali metal persulfate. Stirring and mixing units used in the hot melt trade are suitable equipment for conducting the graft copolymerization, but preferably, reaction extruders are used.

The preferred functional groups of the functional comonomers suitable for functionalizing components (I) and (II) are carboxyl (—COOH) groups or derivatives thereof. Suitable comonomers are, for example, maleic acid, fumaric acid, acrylic acid, methacrylic acid, itaconic acid, aconitic acid or their derivatives such as, for example, maleic and itaconic anhydride, esters such as, for example, methyl (meth)acrylate, ethyl (meth)acrylate, butyl (meth)acrylate, 2-hydroxyethyl (meth)acrylate, and 4-hydroxybutyl (meth)acrylate, salts such as, for example, alkali metal salts, alkaline earth salts, zinc salts and amine salts, amides such as, for example, acrylamide, imides such as, for example, maleimide and itaconimide, adducts of anhydrides with primary or secondary amines such as, for example, adducts of maleic anhydride with ammonia, ethylamine, ethanolamine, aniline or dibutylamine, adducts of anhydrides with mono-, di- or polyols such as, for example, adducts of maleic anhydride with methanol, ethanol, n-butanol, ethanediol, butanediol-1.4, neopentyl glycol, glycerol, pentaerythritol or 1.4-cyclohexanedimethanol, or silanes such as vinyltrimethoxysilane or 3-methacryloxypropyltrimethoxysilane. It should be noted that the free-radical grafting may be associated with a drop in the melt viscosity.

Normally these comonomers are used in amounts of 0.1 to 10 % by weigth, based on the polyolefin to be functionalized. More preferred they are used in amounts of 0.2 to 6 % by weight, and particularly preferred they are used in amounts of 0.4 to 5 % by weight. In this connection, maleic anhydride, fumaric acid and acrylic acid are preferred comonomers.

Obviously, the component (I) may be composed of one or more unfunctionalized poly-α-olefins and a functionalized polymer (e.g., a grafted copolymer), optionally of different composition. The same applies to the component (II).

The functional groups provide the materials with an excellent adhesion to untreated, primed or lacquered sheet metal. In the last two cases mentioned, it proves advantageous for achieving good adhesion if the priming or the lacquer either still contains reactive groups, or is still not completely cured.

The polyolefins functionalized with acid groups, and in particular acid anhydride groups, can be reacted further by esterification with acrylates or methacrylates which contain free hydroxyl groups and which have been prepared, for example, from acrylic acid by esterification with ethanediol, 1,3-propanediol or 1,4-butanediol. In this way, poly-α-olefins are obtained which can be crosslinked by means of irradiation with electrons or UV light.

A further preferred embodiment is the use of a polyolefin carrying such functional groups as an adhesion-promoting layer between the surface to be coated and the protective material which does not contain any functional groups, in which process a two-layer or multilayer composite is applied.

The protective materials can be applied, for example, by applying and heating a sheet prefabricated from the protective material, and also by immersion, rolling, film extrusion, brushing, knife application, or spraying. In these processes, viscosity-reducing additives can be used concomitantly, such as oils which contain double bonds and can be crosslinked by free radicals or exposure to air or heat. Such crosslinkable oils are, for example, linseed oil or polybutadiene oils (for example, those obtained under the trade name HüLS POLYöl ®).

Other features of the invention will become apparent in the course of the following descriptions of exemplary embodiments which are given for illustration of the invention and are not intended to be limiting thereof.

Examples 1. polyolefins used 1.1) An ethene/propene/1-butene terpolymer composed of 65% propene, 31% 1-butene and 4% ethene having the following properties:

| | |
|---|---|
| Viscosity (at 190° C.): | 52,000 mpas |
| Softening point (determined by the ring-and-ball method in accordance with DIN 52,011): | 108° C. |
| Needle penetration (100/25/5) measured in accordance with DIN 52,010: | 1.5 mm |
| Density: | 0.87 g/cm$^3$ |
| Elongation at break: | 950% |
| Glass transition temperature: | −30° C. | was grafted in the melt with 0.5% by weight of maleic anhydride in a reaction extruder in the presence of 0.5% by weight of dicumyl peroxide. After grafting, the properties were as follows:

| | |
|---|---|
| Viscosity (at 190° C.): | 7,800 mpas |
| Softening point: | 103° C. |
| Needle penetration (100/25/5): | 1.7 mm |
| Density: | 0.87 g/cm$^3$ |
| Elongation at break: | 620% |
| Glass transition temperature: | −30° C. |
| Saponification value (after removing the monomeric components): | 3 mg KOH/g |

1.2) The procedure of Example 1.1 was employed, except that 2.5% by weight of maleic anhydride was used instead of 0.5% by weight of maleic anhydride, and 0.25% by weight of dicumyl peroxide was used instead of 0.5% by weight of dicumyl peroxide. The grafted ethene/propene/1-butene terpolymer had the following properties:

| | |
|---|---|
| Viscosity (at 190° C.): | 15,000 mpas |
| Softening point: | 104° C. |
| Needle penetration (100/25/5): | 1.7 mm |
| Density: | 0.88 g/cm$^3$ |
| Elongation at break: | 650% |
| Glass transition temperature: | −30° C. |
| Saponification value (after removing monomeric constituents): | 5 mg KOH/g |

1.3) An ethene/propene/1-butene terpolymer composed of 65% 1-butene, 30% propene and 5% ethene, having the following properties:

| | |
|---|---|
| Viscosity (at 190° C.): | 5,400 mPa s |
| Softening point: | 83° C. |
| Needle penetration (100/25/5): | 3.1 mm |
| Density: | 0.87 g/cm$^3$ |
| Elongation at break: | 380% |
| Glass transition temperature: | −25° C. |

1.4) A propene/1-butene copolymer composed of 69% 1-butene and 31% propene, having the following properties:

| | |
|---|---|
| Viscosity (at 190° C.): | 8,000 mPa s |
| Softening point: | 85° C. |
| Needle penetration (100/25/5): | 1.3 mm |
| Density: | 0.87 g/cm$^3$ |
| Elongation at break: | 280% |
| Glass transition temperature: | −25° C. |

1.5) An ethene/propene/1-butene terpolymer composed of 67% propene, 26% 1-butene and 7% ethene, having the following properties:

| | |
|---|---|
| Viscosity (at 190° C.): | 7,800 mPa s |
| Softening point: | 105° C. |
| Needle penetration (100/25/5): | 2.0 mm |
| Density: | 0.87 g/cm$^3$ |
| Elongation at break: | 320% |
| Glass transition temperature: | −32° C. |

1.6) An ethene/propene/1-butene terpolymer composed of 70% propene, 24% 1-butene and 6% ethene, having the following properties:

| | |
|---|---|
| Viscosity (at 190° C.): | 32,000 mpas |
| Softening point: | 155° C. |
| Needle penetration (100/25/5): | 2.2 mm |
| Density: | 0.87 g/cm$^3$ |
| Elongation at break: | 500% |
| Glass transition temperature: | −34° C. |

1.7) An ethene/propene/1-butene terpolymer composed of 82% propene, 15% ethene and 3% 1-butene, having the following properties:

| | |
|---|---|
| Viscosity (at 190° C.): | 48,000 mPa s |
| Softening point: | 105° C. |
| Needle penetration (100/25/5): | 2.3 mm |
| Density: | 0.87 g/cm$^3$ |
| Elongation at break: | 1,100% |
| Glass transition temperature: | −42° C. |

1.8) Polypropylene grafted with approximately 6% acrylic acid, having a melt flow index (190/5) of 64 g/10 min.

1.9) Polypropylene (homopolymer) grafted with approximately 0.2% maleic anhydride, having a melt flow index (190/5) of 133 g/10 min.

1.10) Polypropylene (random copolymer) grafted with approximately 0.3% maleic anhydride, having a melt flow index (190/5) of 139 g/10 min.

1.11) Polypropylene grafted with approximately 2% maleic anhydride, having a melt viscosity (at 190° C.) of 39,000 mPas, and a viscosity number J of 70 ml/g.

1.12) Polypropylene wax grafted with maleic anhydride, having a molecular weight of approximately 4,500 g/mol, and an acid value of 47 mg KOH/g.

1.13) An isotactic polypropylene, having a viscosity number of 160 ml/g and a melt flow index (190/5) of 60 g/10 min.

1.14) An atactic polypropylene, having a viscosity (at 190° C.) of 8,500mPa s, a softening point of 160° C., and a needle penetration (100/25/5) of 1.9 mm.

Preparation of the grafted amorphous poly-α-olefins and the mixtures tested 2.1 Grafting of the amorphous poly-α-olefins The amorphous poly-α-olefins described in 1.1 and 1.2 grafted with maleic anhydride were prepared using a reaction extruder from Werner & Pfleiderer set at the following machine parameters:

| | Reaction product 1.1 | Reaction product 1.2 |
|---|---|---|
| Screw speed, min$^{-1}$ | 220 | 220 |

-continued

|  | Reaction product 1.1 | Reaction product 1.2 |
|---|---|---|
| Output, kg/h | 15 | 15 |
| Temperature at die head, °C. | 207 | 209 |

2.2 Preparation of the mixtures

All the mixtures were prepared in an oil-heated Meili laboratory kneader (type 1LNS) under a nitrogen atmosphere. The mixing time was generally 60 min, and the temperature of the material was 180° C.

3. Preparation of the test pieces and description of the test methods

Both degreased steel sheets (of area 25×200 mm) and electrophoretically painted sheets (of area 20×100 mm) were used. These were brush-coated with the protective material at a temperature of 190° C. (layer thickness: 0.4 to 2 mm). The test pieces prepared in this way were then maintained at a temperature of 190° C for 10 min. The test pieces were then stored first for 24 hours in air, and then for a) 4 weeks in air at room temperature; b) 10 days under water at room temperature; or c) 2 hours in a freezer at −40° C., respectively. To assess the heat resistance and the low-temperature flexibility, additional storage was carried out for d) 1 hour at 145° C. or e) 2 hours at −30° C., respectively.

After each of storage steps a) through e) had been carried out, the adhesion was rated on a scale of 1 to 6 (1=very good, 6=very poor). The heat resistance and the low-temperature flexibility were assessed as A) passed (rating 1) or B) failed (rating 6). The abrasion resistance (f) was tested by the following method:

Test procedure: Over the course of 65 sec, 2 liters of hard casting sand having a particle diameter of 4.5 mm were allowed to drop vertically through a tube having a diameter of 15 mm and a length of 1 m onto the test sheet, placed underneath the tube at an angle of 45°. The test temperature was 23° C. The number of cycles of the test procedure required to abrade the coating down to the metal sheet was determined. The hard casting sand was replaced after every 100 cycles.

4. Tested formulations (1st part)

| Constituent | Mixture According to the Present Invention | | | | | | | | | | | |
|---|---|---|---|---|---|---|---|---|---|---|---|---|
|  | A | B | C | D | E | F | G | H | I | K | L | M |
| Polyolefin 1.1 |  |  | 45 |  | 50 |  |  |  |  |  | 100 |  |
| Polyolefin 1.2 |  |  |  |  |  |  | 15 |  |  |  |  |  |
| Polyolefin 1.3 | 92 |  |  |  |  | 82 |  |  |  |  |  |  |
| Polyolefin 1.4 |  | 97 |  |  |  |  |  |  |  |  |  |  |
| Polyolefin 1.5 |  |  | 50 | 95 |  |  |  | 86 | 85 | 89.5 |  | 30 |
| Polyolefin 1.6 |  |  |  |  | 40 |  |  |  |  |  |  |  |
| Polyolefin 1.7 |  |  |  |  |  |  | 70 |  |  |  |  | 60 |
| Polyolefin 1.8 |  |  |  | 5 |  |  |  |  | 5 |  |  |  |
| Polyolefin 1.9 | 8 |  |  |  |  |  |  |  |  |  |  |  |
| Polyolefin 1.10 |  |  |  |  |  |  |  | 4 |  |  |  |  |
| Polyolefin 1.11 |  | 3 |  |  |  | 3 |  |  |  |  |  |  |
| Polyolefin 1.12 |  |  |  |  |  |  |  |  |  | 10 |  |  |
| Polyolefin 1.13 |  |  | 5 |  |  | 2 |  |  | 5 |  |  | 7 |
| Aliphatic hydrocarbon resin (ESCOREZ ® 1102) |  |  |  |  |  |  |  |  | 5 |  |  |  |
| Polybutadiene oil (POLYÖL HÜLS ® 110) |  |  |  |  | 10 |  |  |  |  |  |  |  |
| Polyisobutylene (OPPANOL ® B 3) |  |  |  |  |  |  |  | 13 | 10 |  |  |  |
| Thermoplastic rubber SIS (CARIFLEX ® 1107) |  |  |  |  |  | 15 |  |  |  |  |  |  |
| Carbon black (PRINTEX 60) |  |  |  |  |  |  |  |  |  |  | 0.5 |  |
| Limestone powder |  |  |  |  |  |  |  |  |  |  |  | 3 |
| Polyethylene wax (VESTOWAX ® A 616) |  |  |  |  |  |  |  | 5 |  |  |  |  |
| Stabilizer (IRGANOX ® 1010) | 0.4 | 0.4 | 0.4 | 0.4 | 0.4 | 0.4 | 0.4 | 0.4 | 0.4 | 0.4 | 0.4 | 0.4 |

4. Tested formulations (2nd part)

| Constituent | Comparative Mixtures | | |
|---|---|---|---|
|  | N | O | P |
| Polyolefin 1.5 | 70 |  | 70 |
| Polyolefin 1.10 |  | 8 |  |
| Polyolefin 1.14 |  | 92 |  |
| Aliphatic hydrocarbon resin (ESCOREX ® 1102) | 20 |  | 30 |
| Polyethylene wax (VESTOWAX ® A 616) | 10 |  |  |
| Stabilizer (IRGANOX ® 1010) | 0.4 | 0.4 | 0.4 |

5. Test results 5.1 Adhesion tests on electrophoretically painted steel sheets (layer thickness: 1.5 mm)

| Property | Materials According to the Present Invention | | | | | | | | | | | Comparative Materials | | |
|---|---|---|---|---|---|---|---|---|---|---|---|---|---|---|
| | A | B | C | D | E | F | G | H | I | K | L/M* | N | O | P |
| Adhesion after 4 weeks storage in air at room temperature | 2 | 2 | 1 | 1 | 2 | 1 | 1 | 1 | 1 | 2 | 1 | 5 | 2 | 4 |
| Adhesion after 10 days storage in fully de-mineralized water at room temperature | 2 | 2 | 1 | 1 | 3 | 1 | 2 | 1 | 2 | 2 | 1 | 6 | 3 | 5 |
| Adhesion after 2 hours storage at −40° C. in an ethanol/dry ice mixture | 2 | 2 | 2 | 2 | 2 | 2 | 1 | 2 | 2 | 2 | 2 | 6 | 6 | 6 |

*two-layer structure:
L = layer applied directly onto metal (layer thickness 1 mm)
M = surface layer (layer thickness 1 mm)

5.2 Adhesion tests on unlacquered, degreased steel sheets (layer thickness: 1.5 mm)

| Property | Materials According to the Present Invention | | | | | Comparative Materials | | |
|---|---|---|---|---|---|---|---|---|
| | B | C | D | G | L/M* | N | O | P |
| a) Adhesion after 4 weeks storage in air at room temperature | 2 | 1 | 1 | 1 | 1 | 4 | 3 | 3 |
| b) Adhesion after 10 days storage in fully demineralized water at room temperature | 2 | 2 | 1 | 2 | 1 | 4 | 3 | 4 |
| c) Adhesion after 2 hours storage at −40° C. in an ethanol/dry ice mixture | 2 | 2 | 2 | 1 | 1 | 6 | 6 | 5 |

*two-layer structure:
L = layer applied directly onto metal (layer thickness 1 mm)
M = surface layer (layer thickness 1 mm)

5.3 Heat resistance and low-temperature flexibility test on electrophoretically painted steel sheets (layer thickness: 1.5 mm)

| Property | Materials According to the Present Invention | | | | | | | Comparative Materials | | |
|---|---|---|---|---|---|---|---|---|---|---|
| | A | C | F | G | I | K | L/M* | N | O | P |
| d) Heat resistance (steel sheet placed on edge) after 1 hour storage at 145° C. | 1 | 1 | 1 | 1 | 1 | 1 | 1 | 6 | 1 | 6 |
| e) Low-temperature flexibility after 2 hours storage at −30° C. and bending the steel sheet through an angle of 45° | 1 | 1 | 1 | 1 | 1 | 1 | 1 | 6 | 6 | 6 |

*two-layer structure:
L = layer applied directly onto metal (thickness 1 mm)
M = surface layer (layer thickness 1 mm)
1 = passed (material does not flow or crack)
2 = failed (material flows, cracks or peels off)

5.4 Abrasion test on electrophoretically painted steel sheets (layer thickness: 0.4 mm)

| Property | Materials According to the Present Invention | | | | Comparative Materials | | |
|---|---|---|---|---|---|---|---|
| | A | F | G | K | N | O | P |
| f) Cycles traversed before the protective material is destroyed | 63 | 86 | 75 | >100 | 13 | 15 | 18 |

As the experiments show, the protective materials according to the present invention exhibit not only an improved adherence to lacquered and unlacquered metal, but, in addition, are also distinguished by a substantially improved heat resistance, low-temperature flexibility and abrasion resistance. This combination of properties makes these protective materials particularly suitable, especially for use in the underfloor region of motor vehicles.

Obviously, numerous modifications and variations of the present invention are possible in light of the above teachings. The present invention may suitable comprise, consist essentially of, or consist of the components (I), (II) and (III), and may be practiced in the absence of any component which is not specifically described herein. It is therefore to be understood that within the scope of the appended claims, the invention may be practiced otherwise than as specifically described herein.

What is claimed as new and desired to be secured by Letters Patent of the United States is:

1. A composition which protects metallic, primed or lacquered surfaces, comprising:
   (I) not less than 70% by weight of at least one poly-α-olefin having a degree of crystallinity of not more than 25% as determined by X-ray diffraction, comprising the following monomers:
   (a) 3 to 75% by weight of at least one α-olefin having 4 to 10 carbon atoms,
   (b) 25 to 94% by weight of propene, and
   (c) 3 to 20% by weight of ethene; and
   (II) from 2 to 30% by weight of polypropylene,
   wherein at least one of the components (I) and (II) comprises a functionalized polymer produced by free-radical grafting at least one of components (I) and (II) with 0.1 to 10% by weight of one or more functional comonomers selected from the group consisting of maleic anhydride, fumaric acid, acrylic acid, methacrylic acid, itaconic acid, aconitic acid, salts thereof, maleic anhydride, itaconic anhydride, methyl (meth)acrylate, ethyl (meth)acrylate, butyl (meth)acrylate, hydroxyethyl (meth)acrylate, hydroxybutyl (meth)acrylate, acrylamide, maleimide, itaconimide, vinyltrimethoxysilane, 3-methacryloxypropyltrimethoxysilane, and adducts of maleic anhydrides with ammonia, ethylamine, ethanolamine, aniline, dibutylamine, methanol, ethanol, n-butanol, ethanediol, 1,4-butanediol, neopentyl glycol, glycerol, pentaerythritol or 1,4-cyclohexanedimethanol, based on the weight of the component to be functionalized.

2. The composition of claim 1, wherein said α-olefin having 4 to 10 carbon atoms is 1-butene.

3. The composition of claim 1, wherein component (I) has a softening point between 70° and 160° C., a melt viscosity at 190° C. of between 500 and 200,000 mPas, a density of less than 0.90 g/cm$^3$ and an elongation at break of more than 100%.

4. The composition of claim 1, further comprising (III) at least one oil which has carbon-carbon double bonds.

5. The composition of claim 4, wherein said oil is linseed oil or polybutadiene oil.

6. The composition of claim 1, wherein the functional comonomer is selected from the group consisting of maleic anhydride, fumaric acid and acrylic acid.

7. The composition of claim 1, wherein the functionalized copolymer containing acid or acid anhydride groups is reacted further with acrylates or methacrylates which contain free hydroxyl groups.

8. The composition of claim 1, further comprising (III) from 0.4 to 20% by weight of additives selected from the group consisting of oils, heat stabilizers, light stabilizers and carbon black.

* * * * *